No. 681,496. Patented Aug. 27, 1901.
W. A. COWLEY.
ROAD CART.
(Application filed June 10, 1901.)
(No Model.)
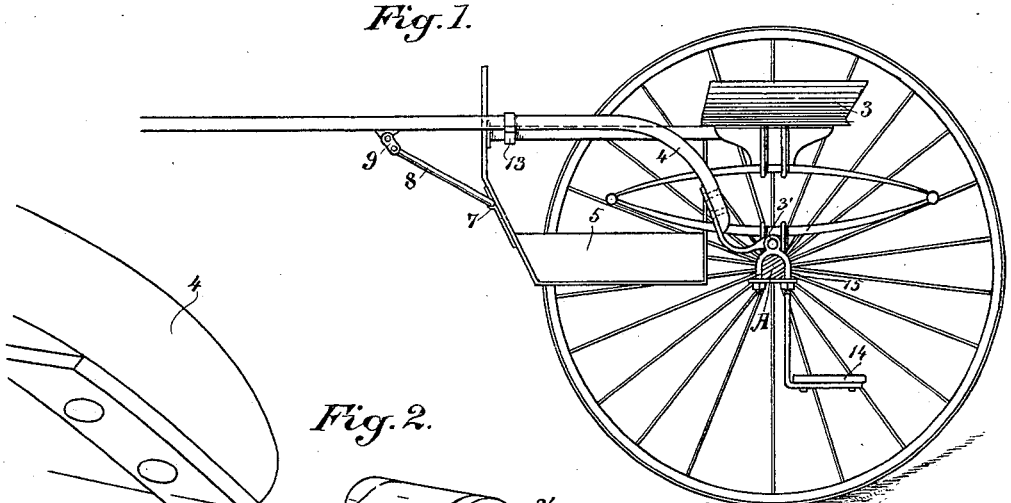
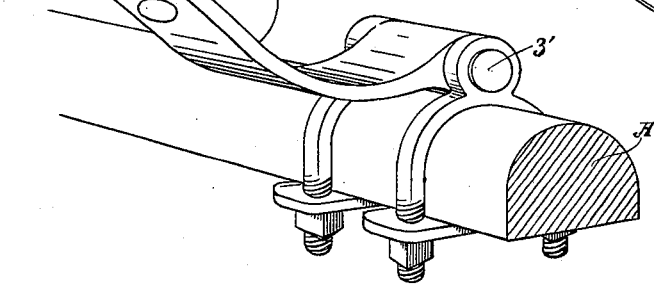
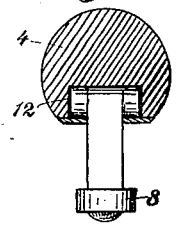
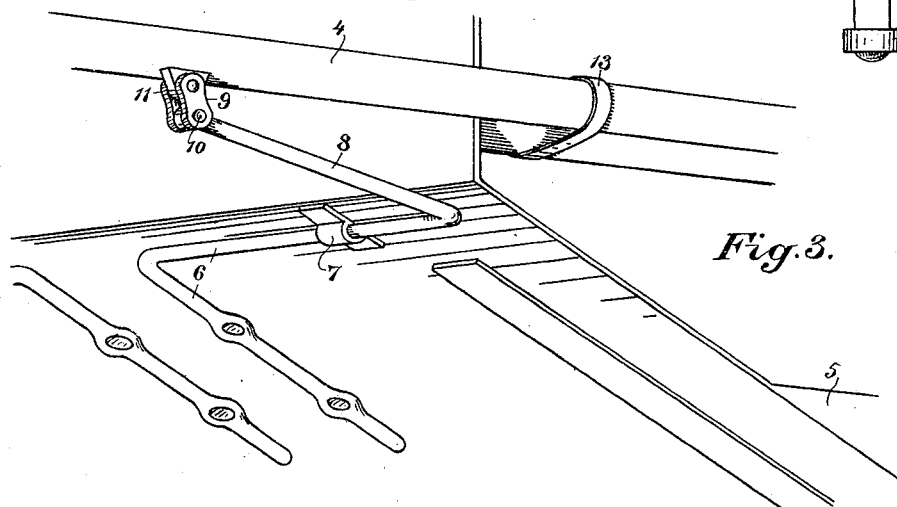
Witnesses,
Inventor,
William A. Cowley
By Dewey Strong & Co.
attys

UNITED STATES PATENT OFFICE.

WILLIAM A. COWLEY, OF BENICIA, CALIFORNIA, ASSIGNOR TO BAKER & HAMILTON, OF SAN FRANCISCO, CALIFORNIA.

ROAD-CART.

SPECIFICATION forming part of Letters Patent No. 681,496, dated August 27, 1901.

Application filed June 10, 1901. Serial No. 63,950. (No model.)

*To all whom it may concern:*

Be it known that I, WILLIAM A. COWLEY, a citizen of the United States, residing at Benicia, county of Solano, State of California, have invented certain Improvements in Road-Carts; and I hereby declare the following to be a full, clear, and exact description of the same.

My invention relates to improvements in the construction of road-carts, and particularly as to the manner of suspending the body, so as to obviate the so-called "horse-motion," so disagreeably noticeable in most vehicles of this type.

It consists, first, in attaching the shafts directly but pivotally to the axle, and, secondly, in connecting the front of the body by a torsional-spring connection to the shaft.

It also comprises details of construction more fully to be hereinafter specified.

Figure 1 is a side elevation of the cart. Fig. 2 shows the manner of attaching the shafts to the axle. Fig. 3 is a partial view of the front of the cart, showing one of the torsional springs and its connections. Fig. 4 is a modification of Fig. 3.

Having reference to the accompanying drawings, A represents the axle of an ordinary two-wheeled carriage, upon which are mounted the springs and seat 3 in the usual manner. The shafts 4 are hinged or otherwise loosely connected, as at 3', with the axle. The body 5 is attached to the seat, so as to form a rigid structure therewith, and its forward end is pivotally secured to the shafts 4 by torsional springs 6 in the following manner: One of the bearings of each of these springs is fixedly secured to the bed and in a plane essentially vertical thereto. From this fixed portion the spring is bent at right angles, and by means of a clip 7 this latter horizontally-bent portion is held against the bed, but not so tightly as to prevent this said portion from having a free turning movement in the clip as a bearing, as will be shortly explained. The spring is again bent upwardly upon itself, as at 8, and approximately at right angles to the horizontal portion, but to form an angle with the plane in which the said vertical and horizontal portions of the spring lie. The ends of these lever-arms 8 are provided with suitable bearings or connections upon the shafts, as the links 9. These links have one end pivoted on the arms, as at 10, and the other to the shafts, as at 11. Thus a partial revolving or vibratory movement at this end of the springs is allowed, securing the proper twisting of the rods in their bearings 8 to develop the proper torsional action. This action of the springs has a notable tendency to equalize the jolting and jerking of the shafts, caused by the movements of travel of the horse, and to give a steady pleasing movement to the cart-bed. The body of the cart is otherwise entirely disconnected from the shafts except that straps 13 may be provided to hold the front end of body up in case of accident and either of the springs should break.

By reason of the hinging of the shafts on the axle the rear end of the body of the cart is not subject to the oscillating movement caused by the up-and-down motion of the horse. By reason of the torsional action of the springs and the pivotal connection of the ends of their arms to the shafts the forward end of the body is relieved entirely of that same up-and-down or "horse" motion. The result is a cart having a steady pleasant movement not affected by any variation in the load carried. It is to be noted that this result is due in great measure to the free pivotal movement of the shafts about the axle. Wherever heretofore the shafts of a cart have been secured directly to the axle their connection therewith has been rigid, and the axle and all carried thereon partake of the rotary movement of the axle.

Another feature of my invention is in securing the footboard 14 rigidly to the axle by means of the clips 15. Ordinarily this board is attached to the body and partakes of all of the springiness of the latter.

In Fig. 4 I have shown a modification of the shaft-bearing. Instead of the link I form the end of each lever-arm 8 with a protuberant portion adapted to slide and be held within a slot 12 on the under side of the shaft.

Having thus described my invention, what I claim as new, and desire to secure by Letters Patent, is—

1. The combination with a wheeled vehicle of a torsional spring having one terminal portion fixedly secured to the bed in an essentially vertical plane, said spring bent at right angles upon said fixed portion to lie in an essentially horizontal line transverse of the bed, said spring again bent to form a lever-arm at an angle to the plane in which said fixed and horizontal portions lie, and loose link connections of the end of this lever with a point of support upon the vehicle.

2. The combination in a two-wheeled vehicle of a bed and springs by which said bed is secured to the shafts, each of said springs having one end secured fixedly to the bed in an essentially vertical plane, said spring bent upon itself to form a horizontal portion, a bearing upon the bed for this horizontal portion, said spring bent again to form a lever-arm at an angle to the plane in which said fixed and horizontal portions lie, and a link pivoted to the end of this arm, said link turnably connected with one of said shafts.

3. The combination in a two-wheeled vehicle, of shafts hinged directly upon the axle, a body having its rear end supported upon said axle, connections of the front end of said body with the shafts, said connections consisting of springs having one end fixedly secured to the body, a horizontal portion turnable in bearings upon said body, an extension of said horizontal portion oppositely disposed to said first-named fixed portion, but at an angle to the plane in which said fixed and horizontal portions lie, links joining said extensions and the shafts, and a footboard fixedly secured to the axle.

In witness whereof I have hereunto set my hand.

WILLIAM A. COWLEY.

Witnesses:
  CHAS. L. HEWES,
  JAS. TEMPLETON.